Feb. 17, 1931.  H. V. NYE  1,792,861
SWITCH GEAR
Filed March 24, 1927
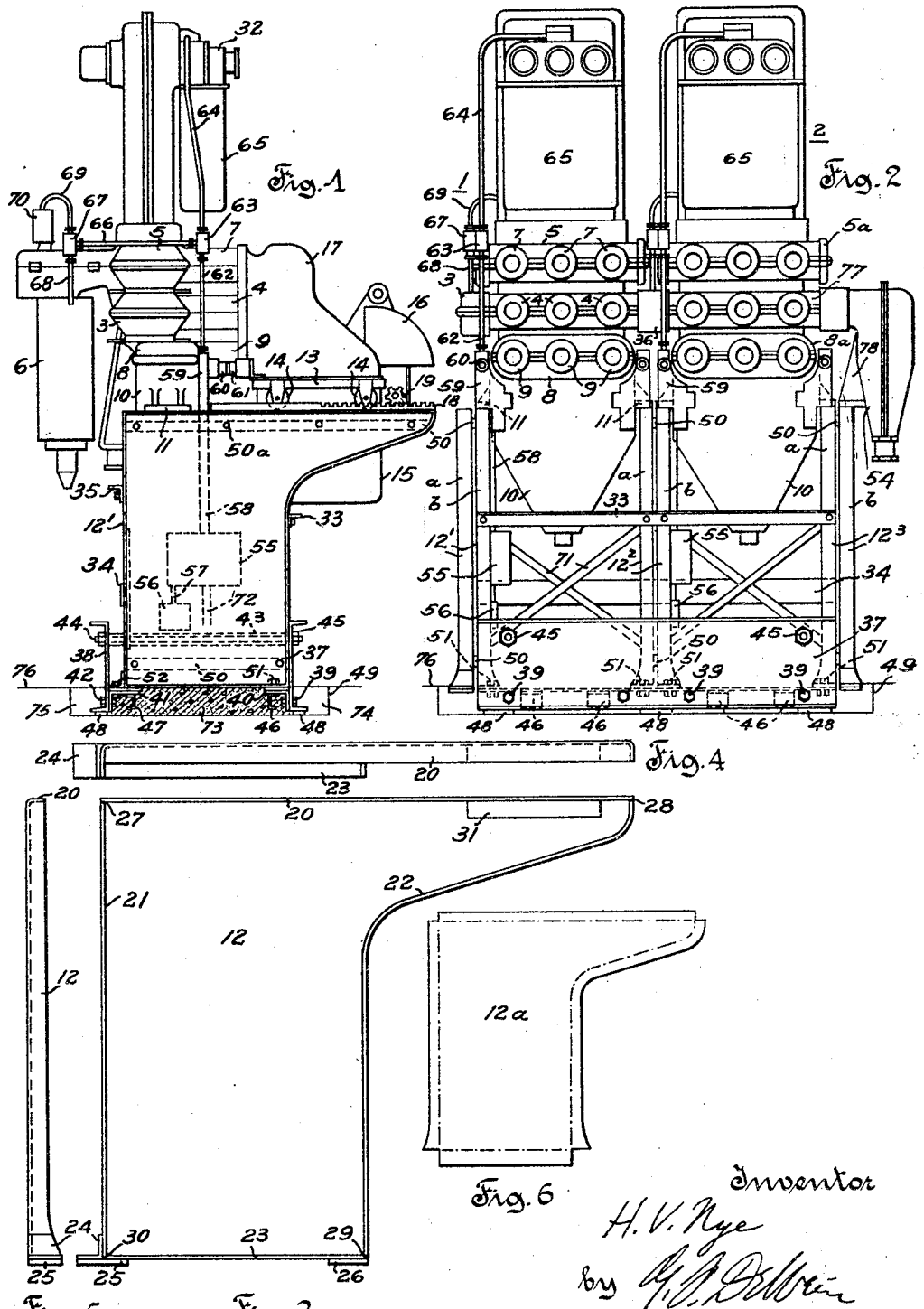
Inventor
H. V. Nye
by
Attorney Patented Feb. 17, 1931

1,792,861

UNITED STATES PATENT OFFICE

HENRY V. NYE, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE

SWITCH GEAR

Application filed March 24, 1927. Serial No. 178,117.

This invention relates to switchgear. It relates particularly to switchgear of the armorclad type.

One of the objects of the invention is the provision of a switchgear construction which will reduce erection costs. A more specific object is the provision of a switchgear construction which may be fully assembled and shipped without disassembling the same; and which may be erected in its permanent location in a simple and efficient manner. A further object is the provision of a switchgear construction comprising self-contained units and particularly of the armorclad type.

Other objects will appear hereinafter as the description of the invention proceeds.

The novel features of the invention will appear from this specification and the accompanying drawing forming a part thereof and disclosing one embodiment of the invention and all these novel features are intended to be pointed out in the claims.

In the drawings:

Fig. 1 is a side elevation of switchgear embodying the invention; and

Fig. 2 is a front elevation of the switchgear, a portion being removed for the sake of clearness.

Fig. 3 is a side elevation of a portion of a side frame forming part of the switchgear; and Figs. 4 and 5 are respectively a top view and an end elevation of the side frame portion shown in Fig. 3.

Fig. 6 shows a blank from which such a side frame portion as shown in Fig. 3 may be formed.

Referring to the drawings and particularly to Fig. 2, this shows two switchgear units 1, 2. A description of the details of the units will be confined to unit 1 inasmuch as unit 2 is the same as unit 1. The stationary portion of the switchgear unit includes a bus bar chamber 3 in which the bus bars (not shown) are disposed. The bus bar chamber 3 is provided with laterally extending sockets 4 as may be clearly seen in Fig. 1, each socket being adapted to contain a conductor terminal connected with one of the bus bars. The switchgear unit here shown is also provided with an auxiliary conductor chamber 5 to which may be attached, or cast integral with a portion thereof, a cable terminal chamber 6. This cable terminal chamber may also contain a series transformer (not shown) or any other desired translating device. The auxiliary chamber 5 is provided with laterally extending conductor terminal sockets 7. The switchgear here shown is also provided with an auxiliary conductor chamber 8 having laterally projecting conductor terminal sockets 9. A cable terminal chamber 10 may be suitably associated with the auxiliary chamber 8. An instrument board 32 is here shown as supported through a suitable column from the auxiliary chamber 5. A chamber 65 which may contain a potential transformer or other translating device (not shown) may be also supported by the column. As here shown the stationary portion of the switchgear comprising the parts hereinbefore described is supported by means of brackets 11 which may be cast integral with the cable terminal chamber 10, on two side frames $12^1$ and $12^2$. Each side frame includes two portions $a$, $b$ spaced by means of spacers 50 and detachably fastened together as by means of a plurality of bolts $50_a$ passing through the portions and spacers. The portions $a$, $b$ are preferably made of pressed steel and will be hereinafter further described.

A carriage 13 provided with rollers 14 is adapted to roll on the top of the portions $b$, $a$ of side frames $12^1$ and $12^2$ respectively. A tank 15 adapted to contain oil is suitably supported from the carriage 15. The tank 15 is adapted to contain and immerse in oil the switch mechanism proper. The carriage 13 also carries operating means for the switch which is disposed in a housing 16. A housing 17 is provided for the leads from the switch within the tank 15 to terminals within the housing 17 which are adapted to engage with conductors in the sockets 4 and either conductors in the sockets 7 or in the sockets 9 depending upon which feeders are in use, that is, the feeders coming into the cable terminal chamber 6 or into the cable terminal chamber 10. It is to be understood that the carriage 13 may be rolled to the right upon the side frame portions b, a as viewed in Fig. 1 so that whatever conductor terminals in the housing 17 which are in use are disengaged from the conductor terminals in the bus bar sockets 4 or in the sockets 7 or 9. This construction has not been shown in detail inasmuch as it forms no part of applicant's present invention. It is to be further noted that for the sake of clearness the carriage 13 with its associated parts is not shown in Fig. 2. The carriage 13 may be moved in and out upon the side frame portions by means of a rack 18 and pinion 19, suitable means being provided for rotating the pinion.

The side frame portions here shown may be formed from a blank $12_a$ such as shown in Fig. 6, the upper portion being bent at right angles to form a ledge 20, see Figs. 3, 4 and 5. The other three edges of the blank are similarly bent to form flanges 21, 22, 23. A piece of angle stock 24 is here shown as welded to the lower end of the rear of the side frame portion and plates 25, 26, preferably fastened by welds, serve as foot plates at the rear and front of the side frame portion. The edges of the flanges are preferably welded to each other in the corners 27, 28, 29, 30. A block 31 is preferably welded beneath the ledge 20 to serve as a reinforcement for said ledge. In Figs. 3, 4 and 5 the side frame portion has been shown before the holes for the bolts $50_a$, cross braces, etc., have been drilled.

The side frames may be braced in any suitable manner as by diagonal cross braces 71.

Two switchgear units only have been shown in Fig. 2. It is to be understood however that any number of units may be placed side by side and suitably associated to form a complete switchgear installation suitable to the particular requirements. Switchgear unit 2 is provided with a bus bar chamber 77 corresponding to bus bar chamber 3 of unit 1. It is also provided with auxiliary chambers $5_a$ and $8_a$ and the stationary upper portion of the organization is supported by the side frame $12^2$ and by a side frame $12^3$, the said stationary portion resting directly on the portion b, a respectively of the said side frames. The bus bar chambers 3 and 77 may be connected by means of a joint member 36 serving to complete the entire enclosure of the bus bars within and passing between the bus bar chambers 77 and 3. The bus bars may be fed by conductors passing through a cable terminal chamber 54. This cable terminal chamber is applied to an end unit of a given set of units. It is preferably provided with a supporting bracket 78 which rests on and is fastened to the portion b of side frame $12^3$.

A conductor terminal box 55 is mounted upon the portion b of side frame $12^1$. This terminal box is adapted to contain all of the terminals associated with the auxiliary or control wiring which must be provided for devices such as trip coils for the switchgear, series and potential transformers, instruments, etc. The fuse box 56 connected by a conduit 57 with the terminal box 55 is also suitably mounted on the said portion b. A conduit 58 leads from the terminal box 55 to a junction box 59. The junction box 59 is provided with an extension 60 adapted to provide a socket for conductors adapted to engage conductors in a socket 61 mounted on the carriage 13. The circuits formed when the conductors in the parts 60 and 61 are in engagement may be various control circuits including trip coil circuits for trip devices disposed upon the carriage. A conduit 62 leads from the junction box 59 to a junction box 63. From that box a conduit 64 leads to the instrument board 32. Also leading from the junction box 63 is a conduit 66 connected to a junction box 67 from which a conduit 68 leads to the chamber 6 thereby providing a passage for conductors to the series transformer within the chamber 6. A conduit 69 also leads from junction box 67 to a box 70 which may contain control switches (not shown). Another conduit 72 leads from the terminal box to a relay panel usually mounted at the front of the two side frame portions b, a, but omitted for the sake of clearness.

In Figs. 1 and 2 the two units shown have been illustrated as assembled in the factory and shipped to the location where they are to be erected permanently. For the sake of simplicity an installation comprising but two units has been illustrated. The unit construction hereinbefore described makes possible shipment of one or more units fully assembled. To facilitate shipment and erection the plurality of units is fastened and braced so that no further relative adjustment in the field will be necessary. To this end, in the particular shipping arrangement here illustrated, channel irons 37, 38 are applied extending across the front and rear respectively of the side frames $12^1$, $12^2$, $12^3$, it being understood that the exact location, width and length of the channels 37, 38 and the method of fastening the same to the side frames is optional depending upon the configuration of the side frames and the best place of application under the particular conditions. The channel iron 37 is fastened by means of bolts 39 to one side of an angle iron 40 the other side of which is fastened to foot plates of the respective side frames by means of bolts 51. The channel iron 38 is fastened by means of bolts 42 to an angle iron 41 in turn fastened by means of bolts 52 to the rear foot plates of the side frames. The channel irons 37, 38 are further braced and held in place by means of one or more bolts 44 each bolt passing through a tube 43 which is of suitable length to properly space the channel irons. Nuts 45 associated with bolt 44 are provided to draw the channel irons 37, 38 up against the ends of the tube 43. For a purpose which will be hereinafter pointed out a suitable number of pieces of channel iron 46 may be fastened, as by welds, to the under side of angle iron 40. A suitable number of pieces of channel iron 47 may in a similar manner be fastened to angle iron 41. Other suitable temporary braces, for shipping purposes, such as angle irons 33 and 35 may be fastened to the plurality of side frames of the switchgear units.

When the switchgear units have reached their destination they are preferably placed in a trench 49. The units may be supported upon strips of wood 48 if desired to suitably locate them in the trench. Concrete or grouting is then poured into the space bounded by the channel irons 37, 38 and the side frames preferably to the floor level 76. The grouting is allowed to set thereby firmly engaging the parts submerged in the grouting. When the grouting has set the channel irons 37, 38 are unbolted and removed along with the bolts 44 and tubes 43 and also the temporary bracing angles 33, 35. Grouting material is then poured into the spaces 74 and 75 up to the floor level.

It will be clear that if the installation is to comprise a comparatively large number of units that they may be shipped in blocks of two or more each block of two or more being separated from the adjacent units by separating the side frames at the ends of the block, this being done by unbolting the two halves of the particular side frames involved.

It should be understood that it is not desired to limit the invention to the exact details of construction shown and described, for obvious modifications may occur to persons skilled in the art.

It is claimed and desired to secure by Letters Patent:

1. The method of shipping and erecting switchgear units each having a bus bar section adapted to be connected to a bus bar section of an adjacent unit which includes assembling before shipment a plurality of units in operative relation with their bus bar sections connected, fastening them together by temporary fastening means, grouting the units in place on their permanent foundations, and removing the temporary fastening means.

2. The method of shipping and erecting switchgear units each having a bus bar section adapted to be connected to a bus bar section of an adjacent unit and having supporting side frames, which includes assembling before shipment a plurality of units in operative relation with the bus bar sections connected, fastening them together by temporary fastening means applied to the front and rear of said side frames and extending below the bottom of said side frames, grouting the units in place on their permanent foundations by pouring the grouting material into the space bounded by the side frames and fastening means, removing said fastening means when said grouting has set, and then grouting in the fronts and backs of said side frames.

3. Switchgear comprising a plurality of units having stationary portions including a bus bar section for each unit adapted to be connected to a bus bar section of an adjacent switchgear unit, said stationary portions including means whereby either one or a plurality of said switchgear units may be shipped with said stationary portions completely assembled, and means for holding said units together for shipment.

4. Switchgear comprising a plurality of units having stationary portions including a bus bar section for each unit adapted to be connected to a bus bar section of an adjacent switchgear unit, auxiliary electrical devices mounted on said stationary portion, said stationary portion including means whereby either one or a plurality of said switchgear units may be shipped with said auxiliary electrical devices completely mounted and wired and means for holding said units together for shipment.

5. In a switchgear unit having the stationary portion including a bus bar section adapted to be connected to a bus bar section of an adjacent switchgear unit and supporting side frames for said unit, at least one of said side frames including a pair of half-frames, and means whereby said half-frames are detachably fastened together and mutually strengthened to act as unitary supporting means for the respective side of the switchgear unit.

6. In a switchgear unit having an upper stationary portion including a bus bar section adapted to be connected to a bus bar section of an adjacent switchgear unit and a lower stationary portion including side frames for each unit, a connection box mounted on one of said side frames, a translating device mounted on said upper stationary portion, and conduit means adapted to carry electrical conductors, carried by said side frame and extending to said translating device.

7. In a switchgear unit having a stationary portion including a bus bar section adapted to be connected to a bus bar section of an adjacent switchgear unit, supporting side frames for said unit, each of said side frames including a pair of half-frames, and means whereby said half-frames of the respective pairs are detachably fastened together and mutually strengthened to act as unitary supporting means for the respective sides of the switchgear unit and a switch supporting carriage having rollers adapted to roll on the two inner half-frames.

8. A supporting means for switchgear comprising a side frame including two flanged pressed metal portions disposed with their convex surfaces toward each other and means for detachably fastening said portions to each other.

9. A supporting means for switchgear comprising a side frame including two flanged pressed metal portions disposed with their convex surfaces toward each other, means for spacing said portions a predetermined distance from each other, and means for detachably fastening said spaced portions to each other.

10. The method of shipping and erecting switchgear units each having a bus bar section adapted to be connected to a bus bar section of an adjacent unit which includes assembling before shipment a plurality of units in operative relation with said bus bar sections connected, fastening them together by temporary fastening means, fastening the units in place on their permanent foundations, and removing the temporary fastening means.

11. A block of a plurality of alined switchgear units ready for shipment and adapted to be erected and used in alinement with at least one additional switchgear unit, supporting side structures between each pair of adjacent units of said block, supporting side structures at each end of said block, at least one of said last mentioned supporting side structures being of a width substantially one-half that of one of said supporting structures between adjacent units, and temporary fastening means for holding the units of said block together.

12. A block of a plurality of alined switchgear units ready for shipment and adapted to be erected and used in alinement with at least one additional switchgear unit, supporting side structures between each pair of adjacent units of said block, a predetermined number of said supporting side structures including two half-frames detachably fastened together, supporting side structures at each end of said block, at least one of said last mentioned supporting side structures being constituted by a single half-frame, and temporary fastening means for holding the units of said block together.

13. Switchgear comprising a plurality of adjacent units each having stationary portions including a bus bar section, means for detachably connecting the bus bar sections of adjacent units, and supporting side structures for said units disposed between adjacent pairs of units, a predetermined number of said side structures including a pair of separable juxtaposed frames, and means including a predetermined number of detachable appliances whereby a given pair of juxtaposed frames are fastened together and mutually strengthened to act as a common supporting means for a pair of adjacent switchgear units.

14. Switchgear comprising a plurality of adjacent units each having housing means in which the bus bar sections and connections thereto, and cable terminals are disposed, and supporting side structures, disposed between adjacent pairs of units, upon which the respective housing means are detachably mounted and removable without disassembling said housing means, a predetermined number of said side structures including a pair of separable juxtaposed frames, each one of a pair of said juxtaposed frames supporting separately the adjacent sides of an adjacent pair of housing means respectively, and means including a predetermined number of detachable appliances whereby a given pair of juxtaposed frames are fastened together to act as a common supporting means for a pair of adjacent housing means.

15. Switchgear comprising a plurality of adjacent units each having housing means in which the bus bar sections and connections thereto, and cable terminals are disposed, switch means having a rollable carriage, and supporting side structures, disposed between adjacent pairs of units, upon which the respective housing means are detachably mounted and removable without disassembling said housing means, a predetermined number of said side structures including a pair of separable juxtaposed frames, each one of a pair of said juxtaposed frames supporting separately the adjacent sides of an adjacent pair of housing means respecively, and means including a predetermined number of detachable appliances whereby a given pair of juxtaposed frames are fastened together to act as a common supporting means for a pair of adjacent housing means, one side of a given switch-means carriage being rollable on one only of a given pair of said juxtaposed frames.

16. Switchgear comprising a plurality of adjacent units each having housing means in which the bus bar sections and connections thereto, and cable terminals are disposed, and supporting side structures, disposed between adjacent pairs of units, upon which the respective housing means are detachably mounted and removable without disassembling said housing means, a predetermined number of said side structures including a pair of separable juxtaposed frames, having upper supporting surfaces, said frames being spaced apart a distance less than the width of said supporting surfaces, each one of a pair of said juxtaposed frames supporting separately the adjacent sides of an adjacent pair of housing means respectively, and means including a predetermined number of detachable appliances whereby a given pair of juxtaposed frames are fastened together to act as a common supporting means for a pair of adjacent housing means.

17. A supporting means for switchgear comprising a side frame including two juxtaposed flanged sheet metal portions, a predetermined number of spacing means between said portions, said portions and spacing means being provided with a predetermined number of registering openings, and detachable bolts passing through said openings respectively, for fastening said portions together in spaced relation.

18. A supporting means for switchgear comprising a side frame including two juxtaposed flanged sheet metal portions, a predetermined number of spacing means between said portions, said spacing means having a width not greater than the width of one of said flanges, said portions and spacing means being provided with a predetermined number of registering openings, and detachable bolts passing through said openings respectively, for fastening said portions together in spaced relation.

19. A supporting means for switchgear comprising a side frame including two flanged sheet metal portions disposed with their convex plane surfaces toward each other, means for spacing said surfaces apart a distance less than the width of one of said flanges, and means for detachably fastening said portions to each other for mutual support.

20. A supporting means for switchgear comprising means including a base plate having an opening, means adapted to be anchored in a foundation having an opening registering with the aforesaid opening, a foundation bolt passing through said openings, and means fastened to said anchoring means for lifting said supporting means.

21. A plurality of alined switchgear units each having a bus car section connected to a bus bar section of an adjacent unit and each having supporting means comprising means including a base plate having an opening, means adapted to be anchored in a foundation having openings registering with the aforesaid openings respectively, foundation bolts passing through said openings respectively and means for lifting said units en bloc including means fastened to and strengthening said anchoring means.

22. A plurality of alined switchgear units each having a bus bar section connected to a bus bar section of an adjacent unit and each having supporting means comprising means including a base plate having an opening, means adapted to be anchored in a foundation having openings registering with the aforesaid openings respectively, foundation bolts passing through said openings respectively and means for mutually strengthening said unit-supporting means and for lifting said units en bloc.

23. A supporting means for switchgear comprising two side frames having feet at the front and rear thereof respectively, said feet having openings, means extending below the level of said feet and joining the front and rear feet respectively, provided with openings registering with those in said feet, bolts passing through said registering openings, and cement embedding said means and fastening the same to a foundation.

24. Switchgear including one or more units of the armorclad type characterized thereby that the stationary portions of the individual units are assembled into a block electrically and mechanically ready for operation, said units including side supports, means for detachably connecting adjacent side supports of adjacent units, and auxiliary means for holding said units together for shipment.

25. Switchgear comprising units having stationary portions including a bus bar section and supporting means therefor, means for connecting adjacent bus bar sections, means for detachably fastening adjacent supporting means to each other, and auxiliary means for holding said units together for shipment.

26. A supporting means for switchgear comprising a side frame including two sheet metal plates provided with upper supporting flanges and lower foot flanges extending laterally therefrom in one direction, said plates being disposed with the unflanged surfaces toward each other, and means for detachably fastening said plates to each other to serve as a unitary rigid side support for said switchgear.

27. A supporting means for switchgear comprising a side frame including two sheet metal plates provided with upper supporting flanges and lower foot flanges extending laterally therefrom in one direction, said plates being disposed with the unflanged surfaces toward each other, means for spacing said plates a predetermined distance from each other, and means for detachably fastening said plates to each other to serve as a unitary rigid side support for said switchgear.

In testimony whereof, the signature of the inventor is affixed hereto.

HENRY V. NYE.